(12) United States Patent
Gao et al.

(10) Patent No.: US 11,558,849 B2
(45) Date of Patent: Jan. 17, 2023

(54) METHOD AND SYSTEMS FOR EXCHANGING MESSAGES IN A WIRELESS NETWORK

(71) Applicant: ZTE CORPORATION, Guangdong (CN)

(72) Inventors: Yin Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/039,004

(22) Filed: Sep. 30, 2020

(65) Prior Publication Data

US 2021/0076351 A1 Mar. 11, 2021

Related U.S. Application Data

(63) Continuation of application No. PCT/CN2018/082017, filed on Apr. 4, 2018.

(51) Int. Cl.
*H04W 68/00* (2009.01)
*H04W 76/12* (2018.01)
(Continued)

(52) U.S. Cl.
CPC .......... *H04W 68/005* (2013.01); *H04W 76/11* (2018.02); *H04W 76/12* (2018.02); *H04W 80/02* (2013.01)

(58) Field of Classification Search
CPC ... H04W 68/005; H04W 76/11; H04W 76/12; H04W 76/22; H04W 80/02
See application file for complete search history.

(56) References Cited

U.S. PATENT DOCUMENTS 9,363,835 B2 6/2016 Ronneke et al.
10,925,103 B2 * 2/2021 Luo ........................ H04W 76/15
(Continued)

FOREIGN PATENT DOCUMENTS

CN 102026398 A 4/2011
CN 103517351 A 1/2014
(Continued)

OTHER PUBLICATIONS

3GPP: "Technical Specification Group Radio Access Network; NG-RAN; Architecture description (Release 15)" 3GPP TS 38.401 VI5.0.0, Dec. 31, 2017 (Dec. 31, 2017), Valbonne, France (23 pages).

(Continued)

*Primary Examiner* — Saad A. Waqas
(74) *Attorney, Agent, or Firm* — Foley & Lardner LLP

(57) ABSTRACT

Methods and system for a centralized unit and a distributed unit of a base station to operatively cooperate with each other are disclosed. In one embodiment, a method performed by a first communication node includes: in response to receiving a request, transmitting a first message to a second wireless communication node requesting to either establish or modify a context of a data radio bearer (DRB); and receiving a second message from the second wireless communication node indicating that the context of the DRB has been established or modified at the second wireless communication node, wherein the first message comprises first user plane address information of the DRB, and the second message comprises second user plane address information of the DRB.

18 Claims, 5 Drawing Sheets

(51) Int. Cl.
*H04W 76/11* (2018.01)
*H04W 80/02* (2009.01)

(56) References Cited

U.S. PATENT DOCUMENTS

| | | | |
|---|---|---|---|
| 2013/0208579 A1 | 8/2013 | Strobel et al. | |
| 2016/0029426 A1 | 1/2016 | Bangolae et al. | |
| 2019/0215726 A1* | 7/2019 | Park | H04W 24/10 |
| 2019/0320476 A1* | 10/2019 | Wang | H04W 76/15 |
| 2020/0178326 A1* | 6/2020 | Sirotkin | H04W 76/12 |
| 2020/0344666 A1* | 10/2020 | Wang | H04W 24/10 |
| 2020/0374689 A1* | 11/2020 | Shi | H04L 12/1407 |

FOREIGN PATENT DOCUMENTS

| | | |
|---|---|---|
| CN | 105009678 A | 10/2015 |
| CN | 105228263 A | 1/2016 |
| CN | 106162730 A | 11/2016 |
| CN | 106211352 A | 12/2016 |
| RU | 2550562 C2 | 5/2015 |
| WO | WO-2014/000498 A1 | 1/2014 |
| WO | WO-2018/044144 A1 | 3/2018 |

OTHER PUBLICATIONS

3GPP: "Technical Specification Group Radio Access Network; Study of separation of NR Control Plane (CP) and User Plane (UP) for split option 2; (Release 15)" 3GPP TR 38.806 VI5.0.0, Dec. 31, 2017 (Dec. 31, 2017), Valbonne, France.

CATT: "Discussion on F1-U UL GTP TEID allocation" ;3GPP TSG-RAN WG3-#99, R3-180833, Mar. 2, 2018 (Mar. 2, 2018), Athens, Greece (3 pages).

International Search Report and Written Opinion for PCT Appl. No. PCT/CN2018/082017 dated Dec. 29, 2018 (7 pages).

First Office Action for RU Appl. No. 2020136192, dated Feb. 26, 2021 (with English translation, 8 pages).

Extended European Search Report for EP Appl. No. 18913944.7, dated Oct. 25, 2021 (9 pages).

First Canadian Exam Report on CA 3Appln No. 095941 dated Oct. 21, 2021 (5 pages).

First Office Action for CN Appl. No. 202110181609.3, dated May 19, 2022 (22 pages, with English translation).

Second Office Action for CA Appl. No. 3095941, dated Oct. 4, 2022 (6 pages).

* cited by examiner

METHOD AND SYSTEMS FOR EXCHANGING MESSAGES IN A WIRELESS NETWORK

CROSS-REFERENCE TO RELATED APPLICATION

This application claims the benefit of priority under 35 U.S.C. § 120 as a continuation of PCT Patent Application No. PCT/CN2018/082017, filed on Apr. 4, 2018, the disclosure of which is incorporated herein by reference in its entirety.

TECHNICAL FIELD

The disclosure relates generally to wireless communications and, more particularly, to exchanging messages between two wireless communication nodes in a wireless network.

BACKGROUND

Due to mass connection and higher rate requirements from users in the 5G New Radio (NR) communication network (5G network), there is a big challenge to the transmission capacity of the fronthaul interface CPRI (Common Public Radio Interface) between a BBU (Baseband Unit) and a RRU (Radio Remote Unit) in the LTE (Long-Term Evolution) communication network. Because the CPRI interface transmits an I/Q (real/imaginary) signal that has been processed by physical layer coding, the CPRI interface has a tighter requirement on the transmission delay and bandwidth. If the 5G F1 interface rate is increased to tens of giga-bits per second (Gbps), the traffic demand on the CPRI interface will rise to tera-bits per second (Tbps) levels, which will increase both the cost and difficulty of network deployment. Therefore, in the 5G network, there is a need to redefine divisions of the fronthaul interface, in consideration of transmission capacity, transmission delay, ease of deployment, and other aspects. For example, taking into account a non-ideal fronthaul transmission, when dividing a base station (BS), one can put delay-insensitive network functions in a first network element, such as a Centralized Unit (CU), and put delay-sensitive network functions in a second network element, such as a Distributed Unit (DU). There is an ideal and/or non-ideal fronthaul transmission between the first network element and second network element.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first communication node includes: in response to receiving a request, transmitting a first message to a second wireless communication node requesting to either establish or modify a context of a data radio bearer (DRB); and receiving a second message from the second wireless communication node indicating that the context of the DRB has been established or modified at the second wireless communication node, wherein the first message comprises first user plane address information of the DRB, and the second message comprises second user plane address information of the DRB.

In another embodiment, a method performed by a second communication node includes: receiving a first message from a first wireless communication node requesting to either establish or modify a context of a data radio bearer (DRB); and transmitting a second message to the first wireless communication node indicating that the context of the DRB has been established or modified at the second wireless communication node, wherein the first message comprises first user plane address information of the DRB, and the second message comprises second user plane address information of the DRB.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the disclosure are described below with reference to the accompanying figures to enable a person of ordinary skill in the art to make and use the disclosure. As would be apparent to those of ordinary skill in the art, after reading the present disclosure, various changes or modifications to the examples described herein can be made without departing from the scope of the disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the disclosure is not limited to the specific order or hierarchy presented unless expressly stated otherwise.

Figure 1:
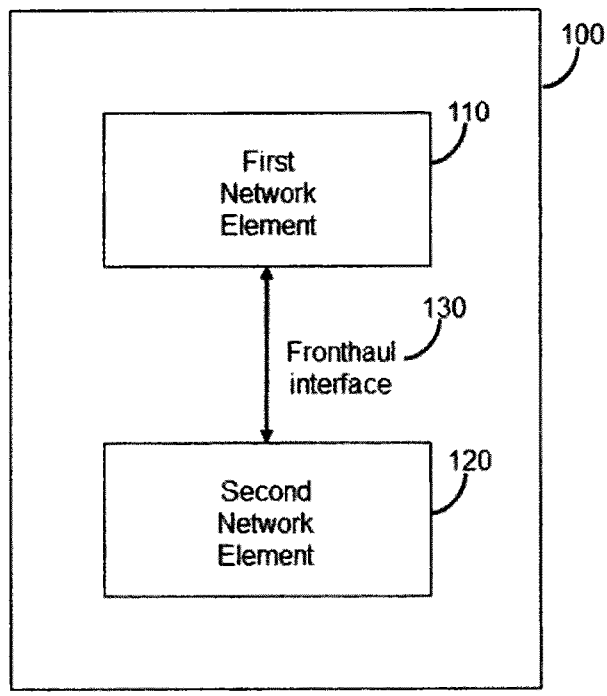
FIG. 1 illustrates a centralized unit-distributed unit (CU-DU) separation structure of a base station of the communication network of FIG. 1, in accordance with some embodiments of the present disclosure.

FIG. 1 illustrates a fronthaul interface between such first network element and second network element of a BS 100. As shown, the BS 100 is divided into a first network element 110 and a second network element 120. The first network element 110 and the second network element 120 communicate through a fronthaul interface 130, where the fronthaul can be an ideal fronthaul or a non-ideal fronthaul according to different delays. An ideal fronthaul transmission has a relatively small delay, such as tens to hundreds of microseconds. A non-ideal fronthaul transmission has a relatively large delay, such as milliseconds. Due to the differences between the ideal and non-ideal fronthaul transmission, there are different ways to divide different network functions into the first network element 110, which is a CU, and the second network element 120, which is a DU. In a CU-DU separation network architecture, delay-insensitive network functions may be placed in the CU; and delay-sensitive network functions may be placed in the DU. Accordingly, a CU and a DU may have different hardware and structure for implementing the different network functions.

For example, a first protocol entity (e.g., a radio resource control (RRC) entity) is located at the CU. The first protocol entity generates control signals, maintains the establishment, modification, and/or release of the radio bearer, and maintains updated parameters of a second protocol entity, a third protocol entity, a fourth protocol entity, and the physical (PHY) layer of the base station. The second protocol entity has a similar or enhanced function compared to the PDCP (Packet Data Convergence Protocol) function of an LTE system. The third protocol entity has a similar or enhanced function compared to the RLC (Radio Link Control) function of an LTE system. The fourth protocol entity has a similar or enhanced function compared to the MAC (Medium Access Control) function of an LTE system. The DU comprises at least one of: the second protocol entity, the third protocol entity, the fourth protocol entity, the physical layer, and the radio frequency (RF) unit of the base station.

Figure 2:
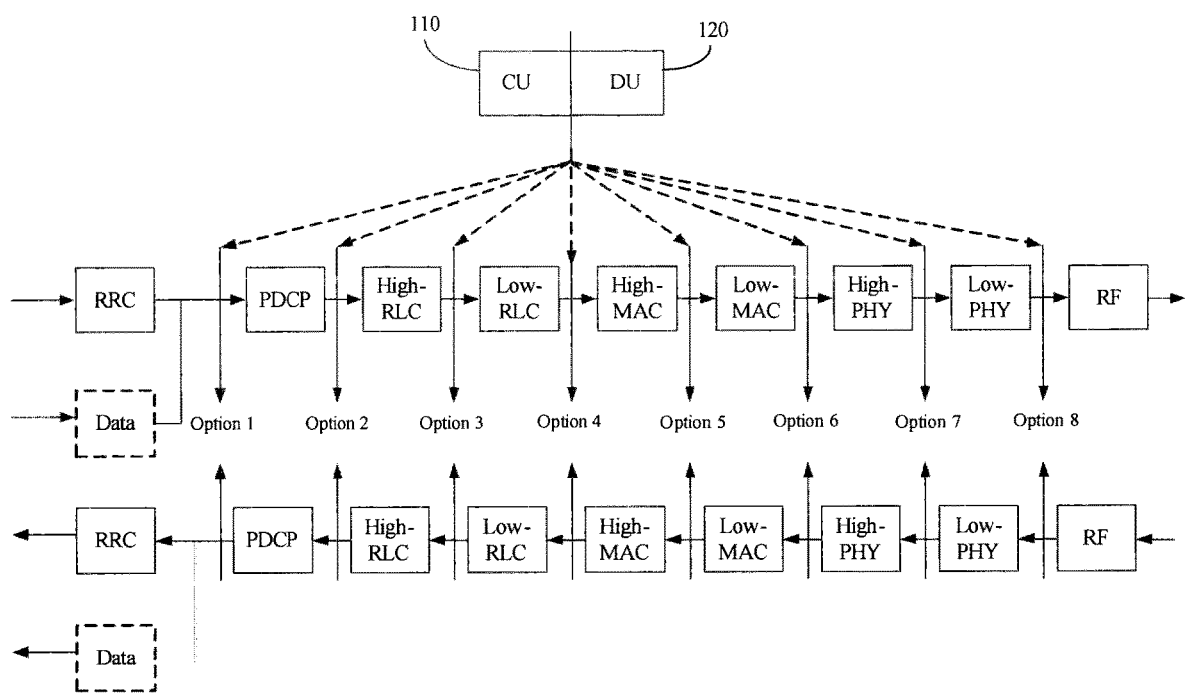
FIG. 2 illustrates exemplary functional divisions between a centralized unit (CU) and a distributed unit (DU) of the base station of FIG. 1, in accordance with some embodiments of the present disclosure.

FIG. 2 illustrates exemplary functional divisions between the first network element and the second network element, e.g. between the CU 110 and the DU 120, in accordance with some embodiments of the present disclosure. More specifically, FIG. 2 illustrates eight possible functional division options between the CU 110 and the DU 120, which are respectively described below. Option 1 (RRC/PDCP separation): The functional separation of this option is similar to the 1A structure in a dual connection (DC). RRC is located within CU; PDCP, RLC, MAC, PHY and RF functions are located in DU. That is, the entire UP is located in DU; Option 2 (PDCP/RLC separation): The functional separation of this option is similar to the 3C structure in a dual connection (DC). RRC and PDCP are located within CU; RLC, MAC, PHY and RF functions are located in DU; Option 3 (RLC high-level/low-level separation): The low-level RLC (partial function of the RLC), MAC, PHY, and RF are located within DU; RRC, PDCP and high-level RLC (partial function of the RLC) functions are located in the CU; Option 4 (RLC-MAC separation): MAC, PHY and RF parts are located within DU; PDCP and RLC functions are located in the CU; Option 5 (MAC internal separation): Some of the MAC functions (such as HARQ), PHY and RF are located in DU; the other upper level functions are located in the CU; Option 6 (MAC-PHY): PHY and RF parts are located in DU; RRC, PDCP, RLC and MAC functions are located in the CU; Option 7 (PHY internal separation): Some of the PHY functions and RF are located in DU; the other upper function is located in the CU; and Option 8 (PHY-RF separation): The RF part is located within the DU; and the other upper level functions are located in the CU.

For the Option 2 discussed above, the PDCP located within the CU may be further separated into a control plane protocol (CP) and a user plane protocol (UP). In other words, CP part and UP part of the PDCP are located in two respective different wireless communication nodes that are divided from the CU. In the following discussions, the wireless communication nodes present the CP part of the PDCP and UP part of the PDCP are herein referred to as "CU-C" and "CU-U," respectively.

To date, however, no research has been conducted regarding how the CU-C and CU-U communicate with each other to manage (e.g., establish, delete, modify, etc.) a Packet Data Unit (PDU) Session. Thus, there is a need for a method and system for the CU-C and CU-U to cooperate with each other to handle such scenarios so as to meet the anticipated demands of the 5G network.

Figure 3:
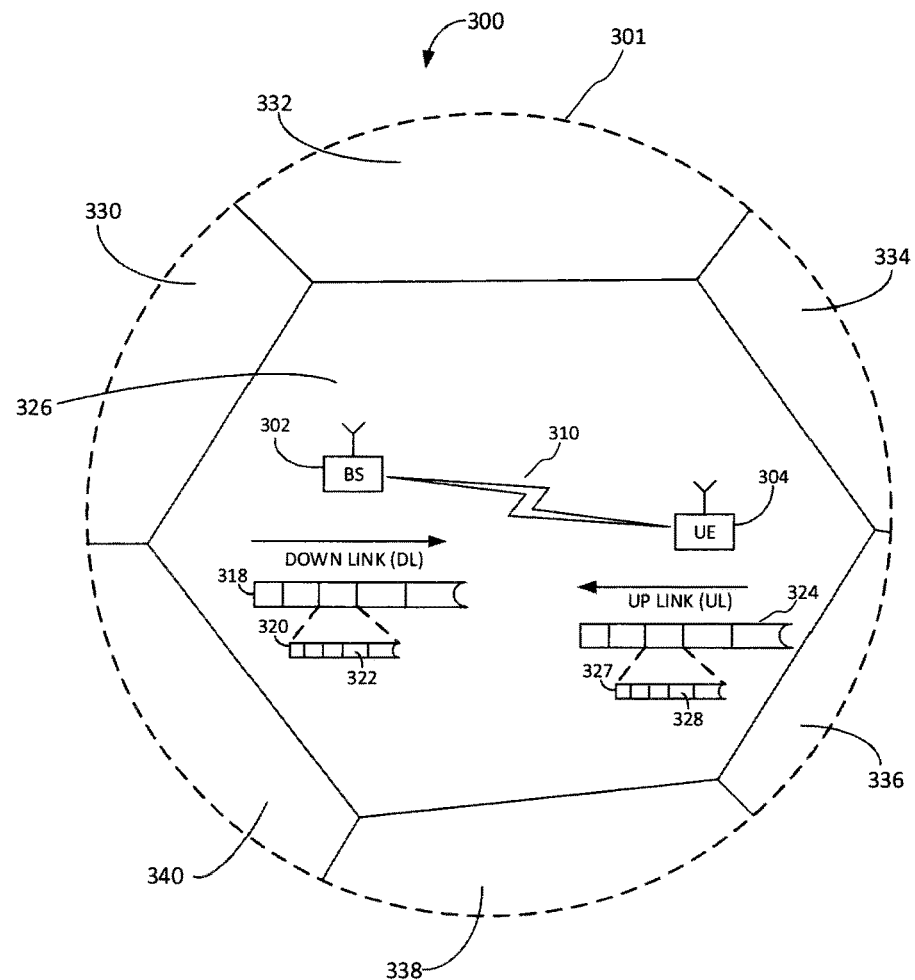
FIG. 3 illustrates an exemplary cellular communication network in which techniques disclosed herein may be implemented, in accordance with some embodiments of the present disclosure.

FIG. 3 illustrates an exemplary wireless communication network 300 in which techniques disclosed herein may be implemented, in accordance with various embodiments of the present disclosure. The exemplary communication network 300 includes a base station (BS) 302 and a user equipment device (UE) 304 that can communicate with each other via a communication link 310 (e.g., a wireless communication channel), and a cluster of notional cells 326, 330, 332, 334, 336, 338 and 340 overlaying a geographical area 301. In FIG. 3, the BS 302 and UE 304 are contained within the geographic boundary of cell 326. Each of the other cells 330, 332, 334, 336, 338 and 340 may include at least one base station operating at its allocated bandwidth to provide adequate radio coverage to its intended users. For example, the base station 302 may operate at an allocated channel transmission bandwidth to provide adequate coverage to the UE 304. The base station 302 and the UE 304 may communicate via a downlink radio frame 318, and an uplink radio frame 324 respectively. Each radio frame 318/324 may be further divided into sub-frames 320/327 which may include data symbols 322/328. In the present disclosure, the base station (BS) 302 and user equipment (UE) 304 are described herein as non-limiting examples of "wireless communication devices or nodes," generally, which can practice the methods disclosed herein. Such communication devices may be capable of wireless and/or wired communications, in accordance with various embodiments of the disclosure.

Figure 4:
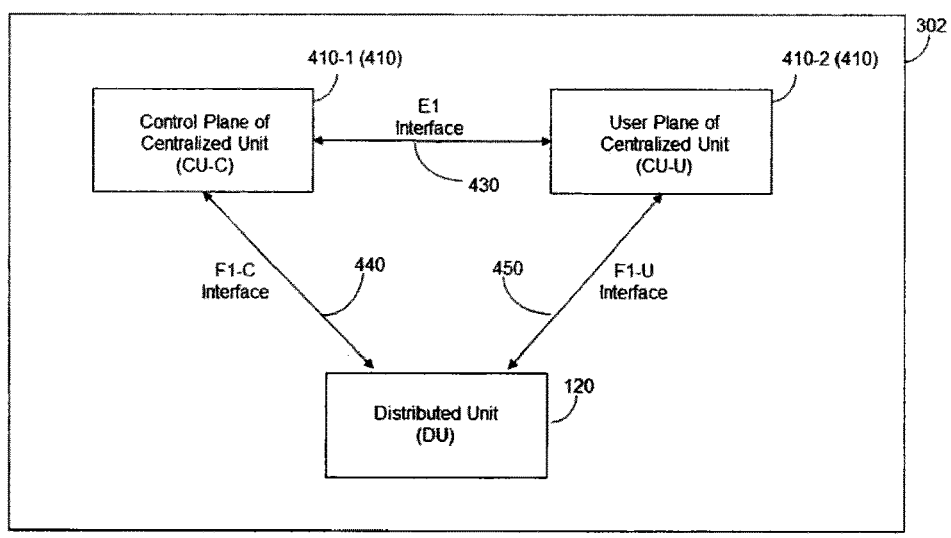
FIG. 4 illustrates an exemplary block diagram of a base station of FIG. 3 being divided into a control plane of a centralized unit (CU-C), a user plane of a centralized unit (CU-U), and a distributed unit (DU), in accordance with some embodiments of the present disclosure.

As mentioned above, in the 5G network, a BS may be separated into a CU and DU, wherein the CU may be further separated into a CU-U and CU-C when the Option 2 is used. FIG. 4 illustrates an exemplary block diagram of the BS 302 that is divided into a CU 410 and DU 420, and the CU 410 is further divided into a CU-C 410-1 and CU-U 410-2, in accordance with some embodiments of the present disclosure. Although the illustrated embodiment of FIG. 4 shows that the BS 302 is divided into one CU-C, one CU-U, and one DU, it is understood that the BS 302 may be divided into one CU-C, plural CU-Cs, and plural DUs while remaining within the scope of the present disclosure. The CU-C 410-1 and CU-U 410-2 communicate with each other through an E1 interface 430, and the CU-C 410-1 and CU-U 410-2 communicate with the DU 420 through an F1-C interface 440 and F1-U interface 450, respectively. In some embodiments, the RRC and the control plane of the PDCP is located in the CU-C 410-1; the user plane of the PDCP is located in the CU-U 410-2; and the RLC, MAC, PHY, and RF are located in the DU 420, as described above.

Figure 5A:
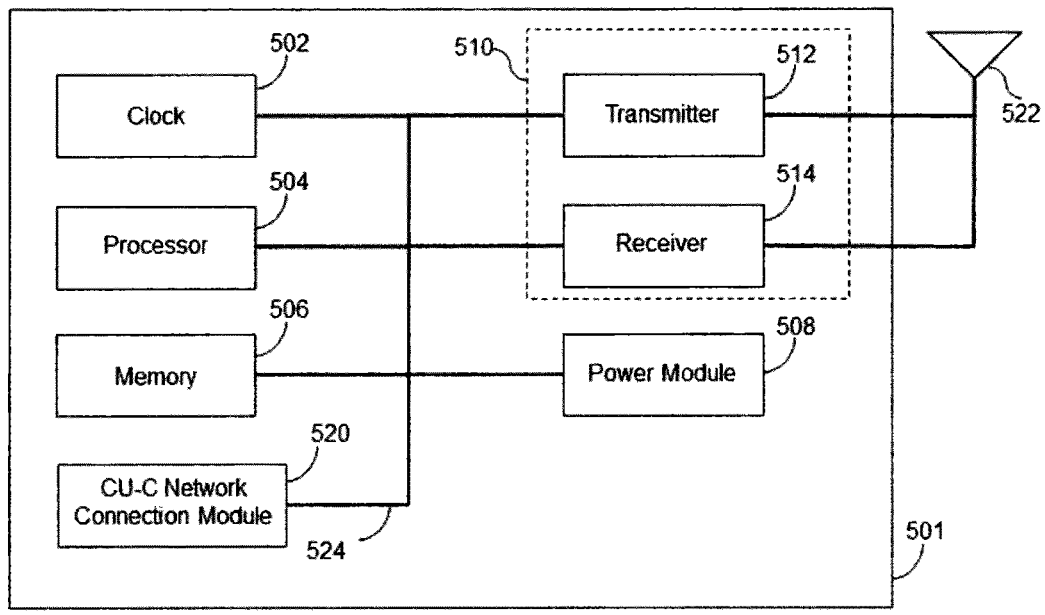
FIGS. 5A, 5B, and 5C respectively illustrate exemplary block diagrams of the CU-C, CU-U, and DU of FIG. 4, in accordance with some embodiments of the present disclosure.

FIG. 5A illustrates an exemplary block diagram of the CU-C 410-1, in accordance with some embodiments of the present disclosure. The CU-C 410-1 is an example of a device that can be configured to implement various methods described, as will be discussed below. As shown, the CU-C 410-1 includes a housing 501 comprising: a system clock 502, a processor 504, a memory 506, a transceiver 510 comprising a transmitter 512 and a receiver 514, a power module 508, and a CU-C network connection module 520. In some embodiments, the above-mentioned components/modules are coupled together by a bus system 524. The bus system 524 can include a data bus and, for example, a power bus, a control signal bus, and/or a status signal bus in addition to the data bus. It is understood that the components/modules of the CU-C 410-1 can be operatively coupled to one another using any suitable techniques and mediums.

In some embodiments, the system clock 502 provides the timing signals to the processor 504 for controlling the timing of all operations of the CU-C 510. The processor 504 controls the general operation of the CU-C 510 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 506, which can include both read-only memory (ROM) and random access memory (RAM), can provide instructions and data to the processor 504. A portion of the memory 506 can also include non-volatile random access memory (NVRAM). The processor 504 typically performs logical and arithmetic operations based on program instructions stored within the memory 506. The instructions (a.k.a., software) stored in the memory 506 can be executed by the processor 504 to perform the methods described herein. The processor 504 and memory 506 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 510, which includes the transmitter 512 and receiver 514, allows the CU-C 410-1 to transmit and receive data to and from a remote device (e.g., CU-U 410-2, DU 420, etc.). In one embodiment, an antenna 522 may be attached to the housing 501 and electrically coupled to the transceiver 510. In various embodiments, the CU-C 410-1 includes (not shown) multiple transmitters, multiple receivers, multiple transceivers, and/or multiple antennas. The transmitter 512 can be configured to wirelessly transmit packets having different packet types or functions, such packets being generated by the processor 504. Similarly, the receiver 514 is configured to receive packets having different packet types or functions, and the processor 504 is configured to process packets of a plurality of different packet types. For example, the processor 504 can be configured to determine the type of packet and to process the packet and/or fields of the packet accordingly. In another embodiment, the CU-C 410-1 may communicate with the DU 420 via fiber-optic communication, such that the transmitter 512 and the receiver 514 can be configured to transmit and receive signals respectively through an optical fiber.

The power module 508 can include a power source such as one or more batteries, and a power regulator, to provide regulated power to each of the above-described modules in FIG. 5A. In some embodiments, if the CU-C 410-1 is coupled to a dedicated external power source (e.g., a wall electrical outlet), the power module 508 can include a transformer and a power regulator.

The CU-C network communication module 520 generally represents the hardware, software, firmware, processing logic, and/or other components of the CU-C 410-1 that enable bi-directional communication between the transceiver 510 and other network components and communication devices configured to communication with the CU-C 410-1 (e.g., the CU-U 410-2, DU 420, etc.). For example, the CU-C network communication module 520 may generate a message that comprises various information associated with a UE that is cooperatively served by the CU 410 (that includes CU-C 410-1 and CU-U 410-2) and DU 420. The CU-C network communication module 520 may send the message to the transmitter 512, and instruct the transmitter 512 to transmit the message to the CU-U 410-2 or the DU 420, where the CU-C 410-1, together with the CU-U 410-2, and the DU 420 can cooperate to serve as a first base station in a wireless network. Detailed operations of the CU-C 410-1 will be discussed in further detail below.

Figure 5B:
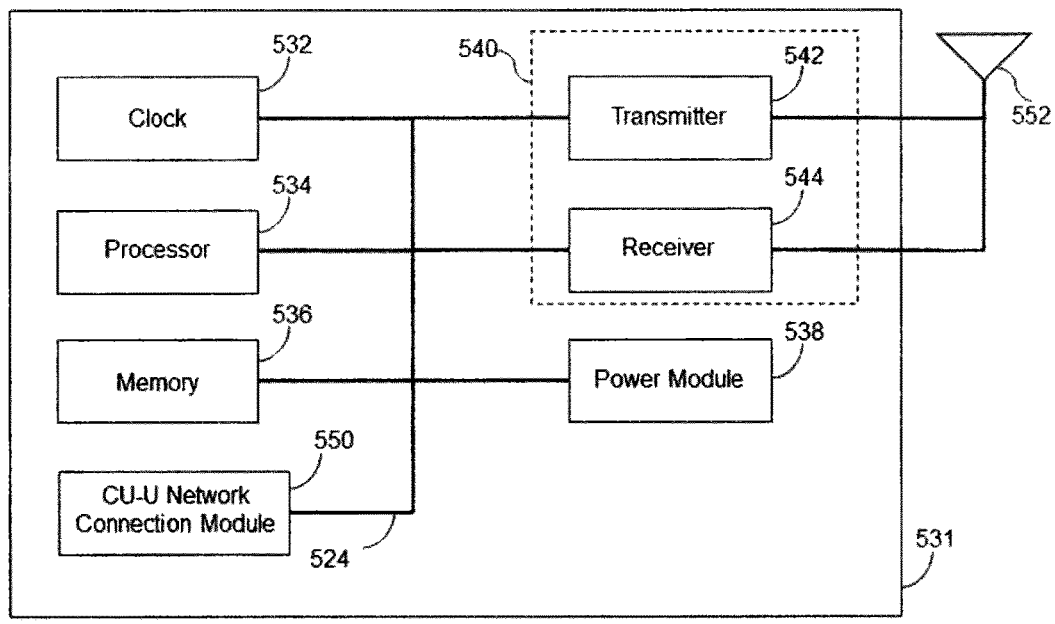
Figure 5C:
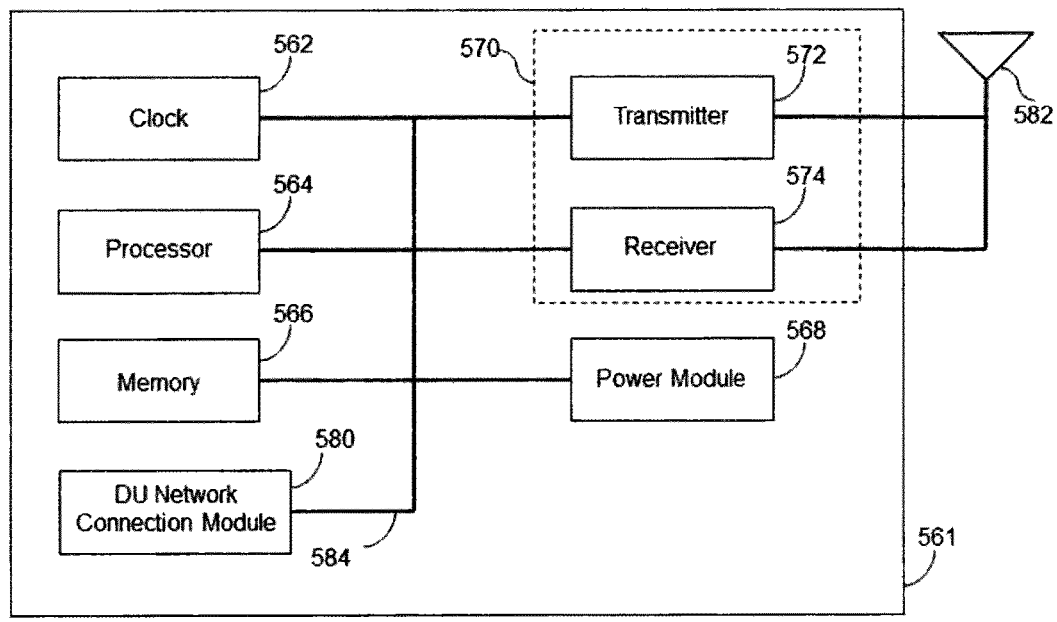

FIGS. 5B and 5C respectively illustrate exemplary block diagrams of the CU-U 410-2 and DU 420, in accordance with some embodiments of the present disclosure. The CU-U 410-2 and DU 420 are each an example of a device that can be configured to implement various methods described, as will be discussed below. As the components of the CU-U 410-2 and DU 420 are substantially similar as the corresponding components of the CU-C 410-1 discussed with reference to FIG. 5A except for CN-U network connection module 550 of the CU-U 410-2 and DN network connection module 580 of the DU 420, respective functionalities of the similar components of the CU-U 410-2 and DU 420 are not repeated again.

Referring first to FIG. 5B, the CU-U 410-2 includes a housing 531 comprising: a system clock 532, a processor 534, a memory 536, a transceiver 540 comprising a transmitter 542 and a receiver 544, a power module 538, and the above-mentioned CU-U network connection module 550. In some embodiments, the above-mentioned components/modules are coupled together by a bus system 554. The bus system 554 can include a data bus and, for example, a power bus, a control signal bus, and/or a status signal bus in addition to the data bus. It is understood that the components/modules of the CU-U 410-2 can be operatively coupled to one another using any suitable techniques and mediums. Referring then to FIG. 5C, the DU 420 includes a housing 561 comprising: a system clock 562, a processor 564, a memory 566, a transceiver 570 comprising a transmitter 572 and a receiver 574, a power module 568, and the above-mentioned DU network connection module 580, wherein the above components/modules are coupled together by a bus system 584.

In some embodiments, The CU-U network communication module 550 generally represents the hardware, software, firmware, processing logic, and/or other components of the CU-U 410-2 that enable bi-directional communication between the transceiver 540 and other network components and communication devices configured to communication with the CU-U 410-2 (e.g., the CU-C 410-1). For example, the CU-U network communication module 550 may generate a message that comprises various information associated with a UE that is cooperatively served by the CU 410 (that includes CU-C 410-1 and CU-U 410-2) and DU 420. The CU-U network communication module 550 may send the message to the transmitter 542, and instruct the transmitter 542 to transmit the message to the CU-C 410-1, where the CU-U 410-2, together with the CU-C 410-1, and the DU 420 can cooperate to serve as a first base station in a wireless network. Detailed operations of the CU-U 410-2 will be discussed in further detail below.

Similarly, the DU network communication module 580 generally represents the hardware, software, firmware, processing logic, and/or other components of the DU 420 that enable bi-directional communication between the transceiver 570 and other network components and communication devices configured to communication with the DU 420 (e.g., the CU-C 410-1, or a UE, etc.). For example, the DU network communication module 580 may process a message that comprises various information associated with the above-mentioned UE. The DU network communication module 580 may send the message to the transmitter 572, and instruct the transmitter 572 to transmit the message to the UE. Detailed operations of the DU 420 will be discussed in further detail below. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The present disclosure provides various embodiments of systems and methods to illustrate how the CU-C 410-1, CU-U 410-2, DU 420 of the BS 302 operatively cooperate to manage (e.g., establish, modify, etc.) a PDU Session. Such an establishment or modification of PDU Session may be initiated by a UE, served by the BS 302, or a core network to which the UE 304 and BS 302 are both connected. In general, the purpose of establishing or modifying the PDU Session is to assign or change resources on a Uu interface and Next Generation User Plane interface (NG-U) for the PDU Session and corresponding Quality of Service (QoS) flows, and to setup corresponding Data Radio Bearers for a given UE.

Figure 6:
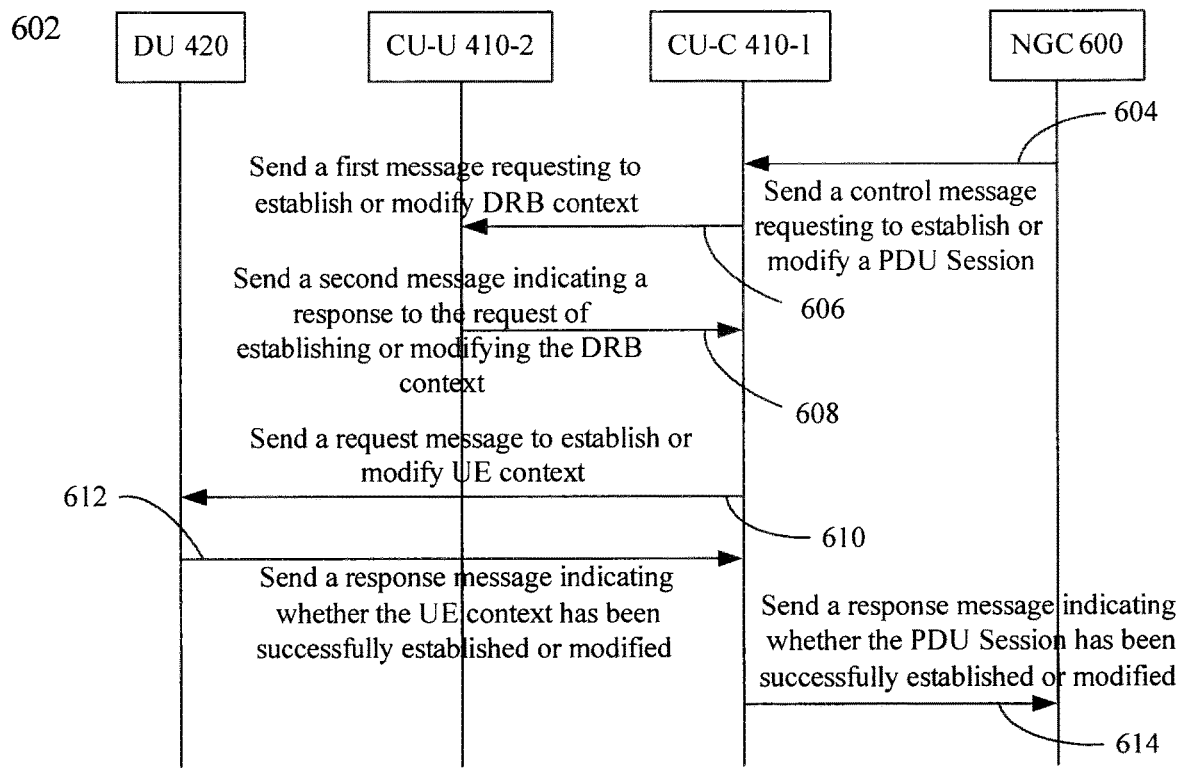
FIG. 6 illustrates a scenario in which the CU-C, CU-U, and DU of the base station of FIG. 4 cooperatively perform an exemplary method to establish or modify a Packet Date Unit (PDU) Session, in accordance with some embodiments of the present disclosure.

FIG. 6 illustrates a scenario in which the CU-C 410-1, CU-U 410-2, DU 420, and a core network 600 (e.g., a Next Generation Core (NGC), or typically known as a "5GC") cooperatively perform a method 602 to establish or modify a PDU Session between a UE (e.g., 304, which is not shown in FIG. 6) and the NGC 600, in accordance with some embodiments. Specifically, the method 602 provides some embodiments regarding how the CU-C 410-1 establish or modify a Data Radio Bearer (DRB) of the PDU Session at the CU-U 410-2. The illustrated embodiment of the method 602 is merely an example. Therefore, it should be understood that any of a variety of operations may be omitted, re-sequenced, and/or added while remaining within the scope of the present disclosure.

The method 602 starts with operation 604 in which the NGC 600 sends a control message to the CU-C 410-1 requesting to establish or modify a PDU Session. In some embodiments, such a control message may be a PDU Session Control Signal, and the NGC 600 may send the control message via a Next Generation (NG) interface in response to receiving a request from the UE 304 or self-determining that a new PDU Session needs to be established or an existing PDU Session needs to be modified, as discussed above. The control message may include various information related to establishing or modifying the PDU Session. For example, the control message may include: a Session Identifier (ID) of the PDU Session, respective ID's of one or more QoS flows of the PDU Session, corresponding Guaranteed Bit Rate (GBR) information of each of the one or more QoS flows of the PDU Session, corresponding Guaranteed Bit Rate (GBR) information of each of the one or more QoS flows of the PDU Session, etc.

The method 602 continues to operation 606 in which the CU-C 410-1 sends a first message to the CU-U 410-2 requesting to establish or modify the context of a DRB at the CU-U 410-2. As mentioned above, each to-be established or modified PDU Session may include one or more QoS flows, and in some embodiments, the DRB may be included in the above-described PDU session, and the CU-C 410-1 may map such one or more QoS flows to the DRB. Further, the CU-C 410-1 may include QoS-related information corresponding to the DRB (e.g., one or more QoS profiles), DRB allocation information, and first user plane address information of the DRB, in the first message and send the first message to the CU-U 410-2 via the E1 interface 430 (FIG. 4).

In some embodiments, the DRB allocation information may indicate whether the CU-C 410-1 is serving the UE 304 via a Dual Connectivity (DC) configuration, and whether a Packet Data Convergence Protocol (PDCP) of the DRB is located in the CU-C 410-1. The term "DC" as used herein is generally referred to as wireless communication configuration in which a multiple Rx/Tx UE is configured to use radio resources provided by two distinct wireless communication nodes (i.e. served by these two distinct wireless communication nodes), one of which provides E-TURA (typically known as Long Term Evolution (LTE)) access and the other of which provides New Radio (NR) access. Generally, one of such wireless communication nodes is referred to as a Master Node, and the other is referred to as a Secondary Node, wherein at least the Master Node is connected to a core network. Accordingly, in some embodiments, the CU-C 410-1, CU-U 410-2, and the DU 420, cooperatively serving as the BS 302 (FIG. 3), may serve as a Secondary Node of a DC network while another BS may serve as a Master Node of the DC network.

Based on whether the CU-C 410-1 is serving the UE 304 via the DC configuration, and whether the corresponding PDCP of the DRB is located in the CU-C 410-1, in some embodiments, the first user plane address information of the DRB included in the first message may vary. For example, when the first message indicates that the CU-C 410-1 is not serving the UE 304 via the DC configuration, the first user plane address information of the DRB comprises: an S1/NG Uplink (UL) General Packet Radio Service Tunneling Protocol (GTP) Tunnel Endpoint Identifier (TEID) in the NGC; when the first message indicates that the CU-C 410-1 is serving the UE 304 via the DC configuration and the PDCP of the DRB is located in the CU-C 410-1, the first user plane address information of the DRB comprises: the S1/NG UL GTP TEID in the NGC and a Downlink (DL) GTP TEID in the Master Node of the DC network; and when the first message indicates that the CU-C 410-1 is serving the UE 304 via the DC configuration and the PDCP of the DRB is not located in the CU-C 410-1, the first user plane address information of the DRB comprises: an X2/Xn UL GTP TEID in the Master Node of the DC network.

The method 602 continues to operation 608 in which the CU-U 410-2 sends a second message to the CU-C 410-1 indicating a response to the request of establishing or modifying the context of the DRB. In some embodiments, in response to receiving the first message, the CU-U 410-2 allocates resources for the to-be established or modified context of the DRB. More specifically, if the CU-U 410-2 can successfully follow the information included in the first message to allocate the resource for the context of the DRB, the CU-U 410-2 may send the second message, which includes second user plane address information of the DRB, to the CU-C 410-1 to acknowledge the successful establishment or modification of the context of the DRB; and on the other hand, if the CU-U 410-2 cannot successfully follow the information included in the first message to allocate the resource for the context of the DRB, the CU-U 410-2 may send the second message to reject the establishment or modification of the context of the DRB.

In some embodiments, based on whether the CU-C 410-1 is serving the UE 304 via the DC configuration, and whether the corresponding PDCP of the DRB is located in the CU-C 410-1 as indicated in the first message, the second user plane address information of the DRB included in the second message may vary. For example, when the second message indicates that the CU-C 410-1 is not serving the UE 304 via the DC configuration, the second user plane address information of the DRB comprises: an S1/NG Downlink (DL) GTP TEID at the CU-U 410-2 and an F1 UL GTP TEID at the CU-U 410-2; when the first message indicates that the CU-C 410-1 is serving the UE 304 via the DC configuration and the PDCP of the DRB is located in the CU-C 410-1, the second user plane address information of the DRB comprises: an S1/NG DL GTP TEID at the CU-U 410-2; an X2/Xn UL GTP TEID in the Secondary Node of the DC network; an X2/Xn DL Forwarding GTP TEID; an X2/Xn UL Forwarding GTP TEID; and an F1 UL GTP TEID at the CU-U 410-2; and when the first message indicates that the CU-C 410-1 is serving the UE 304 via the DC configuration and the PDCP of the DRB is not located in the CU-C 410-1, the second user plane address information of the DRB comprises: an X2/Xn DL GTP TEID in the Secondary Node of the DC network.

Based on the second message in which, for example, the resource for the context of the DRB has been successfully allocated by the CU-U 410-2, in some embodiments, a portion of the DRB may be referred to as being successfully established or modified across the CU-C 410-1 and CU-U 410-2. Accordingly, the CU-C 410-1, DU 420, and the NGC 600 may each perform one or more operations known by persons of ordinary skills in the art to finish the establishment or modification of the PDU Session. Such operations will be briefly described as follows. For example, the method 600 proceeds to operation 610 in which the CU-C 410-1 sends a request message to DU 420 to establish or modify a context of the UE 304 at the DU 420; then to operation 612 in which the DU 420 sends a response message to the CU-C 410-1 indicating whether the context of the UE 304 has been successfully established or modified at the DU 420; and to operation 614 in which the CU-C 410-1 sends a response message to the NGC indicating whether the PDU Session has been successfully established or modified.

Figure 7:
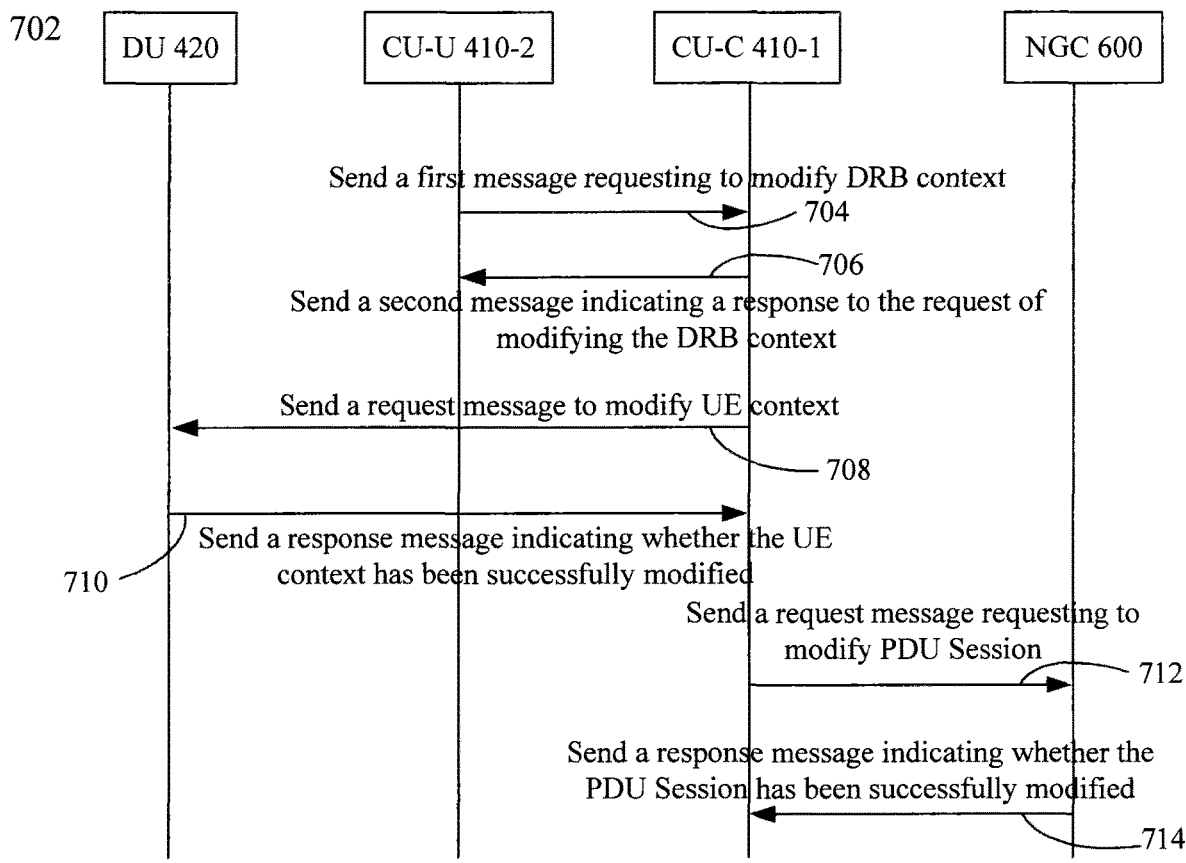
FIG. 7 illustrates another scenario in which the CU-C, CU-U, and DU of the base station of FIG. 4 cooperatively perform an exemplary method to modify a PDU Session, in accordance with some embodiments of the present disclosure.

FIG. 7 illustrates another scenario in which the CU-C 410-1, CU-U 410-2, DU 420, and the NGC 600 cooperatively perform a method 702 to modify a PDU Session between a UE (e.g., 304, which is not shown in FIG. 7) and the NGC 600, in accordance with some embodiments. Different from the method 602 of FIG. 6, in the illustrated embodiment of FIG. 7, the CU-U 410-2 initiates a request to change the context of a DRB of the PDU Session. The illustrated embodiment of the method 702 is merely an example. Therefore, it should be understood that any of a variety of operations may be omitted, re-sequenced, and/or added while remaining within the scope of the present disclosure.

The method 702 starts with operation 704 in which the CU-U 410-2 sends a first message to the CU-C 410-1 requesting to modify the context of the DRB at the CU-U 410-2. In some embodiments, the CU-U 410-2 may include QoS-related information corresponding to the DRB (e.g., one or more QoS profiles), DRB allocation information, and first user plane address information of the DRB, in the first message and send the first message to the CU-C 410-1 via the E1 interface 430 (FIG. 4).

In some embodiments, the DRB allocation information may indicate whether the CU-C 410-1 is serving the UE 304 via a Dual Connectivity (DC) configuration, and whether a Packet Data Convergence Protocol (PDCP) of the DRB is located in the CU-C 410-1.

Based on whether the CU-C 410-1 is serving the UE 304 via the DC configuration, and whether the corresponding PDCP of the DRB is located in the CU-C 410-1, in some embodiments, the first user plane address information of the DRB included in the first message may vary. For example, when the first message indicates that the CU-C 410-1 is not serving the UE 304 via the DC configuration, the first user plane address information of the DRB comprises: an S1/NG Uplink (UL) General Packet Radio Service Tunneling Protocol (GTP) Tunnel Endpoint Identifier (TEID) in the NGC; when the first message indicates that the CU-C 410-1 is serving the UE 304 via the DC configuration and the PDCP of the DRB is located in the CU-C 410-1, the first user plane address information of the DRB comprises: the S1/NG UL GTP TEID in the NGC and a Downlink (DL) GTP TEID in the Master Node of the DC network; and when the first message indicates that the CU-C 410-1 is serving the UE 304 via the DC configuration and the PDCP of the DRB is not located in the CU-C 410-1, the first user plane address information of the DRB comprises: an X2/Xn UL GTP TEID in the Master Node of the DC network.

The method 702 continues to operation 706 in which the CU-C 410-1 sends a second message to the CU-U 410-2 indicating a response to the request of modifying the context of the DRB. In some embodiments, in response to receiving the first message, the CU-C 410-1 modifies the context of the DRB. More specifically, if the CU-C 410-1 can successfully follow the information included in the first message to modify the context of the DRB, the CU-C 410-1 may send the second message, which includes the successfully modified context of the DRB, and corresponding second user plane address information of the DRB, to the CU-U 410-2 to acknowledge the successful establishment or modification of the context of the DRB; and on the other hand, if the CU-C 410-1 cannot successfully follow the information included in the first message to modify the context of the DRB, the CU-C 410-1 may send the second message to reject the modification of the context of the DRB.

In some embodiments, based on whether the CU-C 410-1 is serving the UE 304 via the DC configuration, and whether the corresponding PDCP of the DRB is located in the CU-C 410-1 as indicated in the first message, the second user plane address information of the DRB included in the second message may vary. For example, when the second message indicates that the CU-C 410-1 is not serving the UE 304 via the DC configuration, the second user plane address information of the DRB comprises: an S1/NG Downlink (DL) GTP TEID at the CU-U 410-2 and an F1 UL GTP TEID at the CU-U 410-2; when the first message indicates that the CU-C 410-1 is serving the UE 304 via the DC configuration and the PDCP of the DRB is located in the CU-C 410-1, the second user plane address information of the DRB comprises: an S1/NG DL GTP TEID at the CU-U 410-2; an X2/Xn UL GTP TEID in the Secondary Node of the DC network; an X2/Xn DL Forwarding GTP TEID; an X2/Xn UL Forwarding GTP TEID; and an F1 UL GTP TEID at the CU-U 410-2; and when the first message indicates that the CU-C 410-1 is serving the UE 304 via the DC configuration and the PDCP of the DRB is not located in the CU-C 410-1, the second user plane address information of the DRB comprises: an X2/Xn DL GTP TEID in the Secondary Node of the DC network.

Based on the second message in which, for example, the resource for the context of the DRB has been successfully modified by the CU-C 410-1, in some embodiments, a portion of the DRB may be referred to as being successfully established or modified across the CU-C 410-1 and CU-U 410-2. Accordingly, the CU-C 410-1, DU 420, and the NGC 600 may each perform one or more operations known by persons of ordinary skills in the art to finish the establishment or modification of the PDU Session. Such operations will be briefly described as follows. For example, the method 700 proceeds to operation 708 in which the CU-C 410-1 sends a request message to the DU 420 to modify a context of the UE 304 at the DU 420; to operation 710 in which the DU 420 sends a response message to the CU-C 410-1 indicating whether the context of the UE 304 has been successfully modified at the DU 420; to operation 712 in which the CU-C 410-1 sends a request message to the NGC requesting to modify the PDU Session; and to operation 714 in which the NGC 600 sends a response message to the CU-C 410-1 indicating whether the PDU Session has been successfully modified.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations.

Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a first wireless communication node, comprising:
    transmitting a first message to a second wireless communication node requesting to either establish or modify a context of a data radio bearer (DRB) within the second communication node, the context of the DRB associated with a bearer context for a user equipment (UE) device; and
    receiving a second message from the second wireless communication node indicating that the context of the DRB has been established or modified at the second wireless communication node,
    wherein the first message comprises DRB allocation information, and first user plane address information of the DRB associated with the bearer context, the first user plane address information comprising a S1 Uplink (UL) General Packet Radio Service Tunneling Protocol (GTP) Tunnel Endpoint Identifier (TEID) or a NG UL GTP TEID,
    wherein the second message comprises second user plane address information of the DRB associated with the bearer context, the second user plane address information comprising a F1 UL GTP TEID at the second wireless communication node, and a S1 Downlink (DL) GTP TEID or a NG DL GTP TEID at the second wireless communication node, and
    wherein in response to the DRB allocation information of the first message indicating that the first wireless communication node is serving the user equipment device via Dual Connectivity (DC) and Packet Data Convergence Protocol (PDCP) of the DRB is located in the first wireless communication node, the first user plane address information of the DRB further comprises: a DL GTP TEID in a master node.

2. The method of claim 1, wherein:
    the first wireless communication node functions as a control plane of a central unit; and
    the second wireless communication node functions as a user plane of the central unit.

3. The method of claim 1, comprising:
    in response to receiving a request, transmitting the first message to the second wireless communication node.

4. The method of claim 1, wherein the second user plane address information of the DRB further comprises at least one of:
    a X2 DL Forwarding GTP TEID or a Xn DL Forwarding GTP TEID; or
    a X2 UL Forwarding GTP TEID or a Xn UL Forwarding GTP TEID.

5. The method of claim 4, wherein the first message indicates whether the first wireless communication node is serving a user equipment device via Dual Connectivity (DC), and whether a Packet Data Convergence Protocol (PDCP) of the DRB is located in the first wireless communication node.

6. The method of claim 5, wherein in response to the first message indicating that the first wireless communication node is serving the user equipment device via the DC and the PDCP of the DRB is located in the first wireless communication node, the second user plane address information of the DRB further comprises:
    a X2 UL GTP TEID or a Xn UL GTP TEID in the Secondary Node (Snode).

7. A method performed by a second wireless communication node, comprising:
    receiving a first message from a first wireless communication node requesting to either establish or modify a context of a data radio bearer (DRB) within the second communication node, the context of the DRB associated with a bearer context for a user equipment (UE) device; and
    transmitting a second message to the first wireless communication node indicating that the context of the DRB has been established or modified at the second wireless communication node,
    wherein the first message comprises DRB allocation information, and first user plane address information of the DRB associated with the bearer context, the first user plane address information comprising a S1 Uplink (UL) General Packet Radio Service Tunneling Protocol (GTP) Tunnel Endpoint Identifier (TEID) or a NG UL GTP TEID, wherein the second message comprises second user plane address information of the DRB associated with the bearer context, the second user plane address information comprising a F1 UL GTP TEID at the second wireless communication node, and a S1 Downlink (DL) GTP TEID or a NG DL GTP TEID at the second wireless communication node, and wherein in response to the DRB allocation information of the first message indicating that the first wireless communication node is serving the user equipment device via Dual Connectivity (DC) and Packet Data Convergence Protocol (PDCP) of the DRB is located in the first wireless communication node, the first user plane address information of the DRB further comprises: a DL GTP TEID in a master node.

8. The method of claim 7, wherein:
the first wireless communication node functions as a control plane of a central unit; and
the second wireless communication node functions as a user plane of the central unit.

9. The method of claim 7, wherein the second user plane address information of the DRB further comprises at least one of:
a X2 DL Forwarding GTP TEID or a Xn DL Forwarding GTP TEID; or
a X2 UL Forwarding GTP TEID or a Xn UL Forwarding GTP TEID.

10. The method of claim 9, wherein the first message indicates whether the first wireless communication node is serving a user equipment device via Dual Connectivity (DC), and whether a Packet Data Convergence Protocol (PDCP) of the DRB is located in the first wireless communication node.

11. The method of claim 10, wherein in response to the first message indicating that the first wireless communication node is serving the user equipment device via the DC and the PDCP of the DRB is located in the first wireless communication node, the second user plane address information of the DRB further comprises:
a X2 UL GTP TEID or a Xn UL GTP TEID in the Secondary Node (Snode).

12. A first wireless communication node, comprising:
at least one processor configured to:
transmit a first message to a second wireless communication node requesting to either establish or modify a context of a data radio bearer (DRB) within the second communication node, the context of the DRB associated with a bearer context for a user equipment (UE) device; and
receive a second message from the second wireless communication node indicating that the context of the DRB has been established or modified at the second wireless communication node,
wherein the first message comprises DRB allocation information, and first user plane address information of the DRB associated with the bearer context, the first user plane address information comprising a S1 Uplink (UL) General Packet Radio Service Tunneling Protocol (GTP) Tunnel Endpoint Identifier (TEID) or a NG UL GTP TEID,
wherein the second message comprises second user plane address information of the DRB associated with the bearer context, the second user plane address information comprising a F1 UL GTP TEID at the second wireless communication node, and a S1 Downlink (DL) GTP TEID or a NG DL GTP TEID at the second wireless communication node, and wherein in response to the DRB allocation information of the first message indicating that the first wireless communication node is serving the user equipment device via Dual Connectivity (DC) and Packet Data Convergence Protocol (PDCP) of the DRB is located in the first wireless communication node, the first user plane address information of the DRB further comprises: a DL GTP TEID in a master node.

13. The first wireless communication node of claim 12, wherein:
the first wireless communication node functions as a control plane of a central unit; and
the second wireless communication node functions as a user plane of the central unit.

14. The first wireless communication node of claim 12, at least one processor configured to:
in response to receiving a request, transmit the first message to the second wireless communication node.

15. The first wireless communication node of claim 12, wherein the second user plane address information of the DRB further comprises at least one of:
a X2 DL Forwarding GTP TEID or a Xn DL Forwarding GTP TEID; or
a X2 UL Forwarding GTP TEID or a Xn UL Forwarding GTP TEID.

16. A second wireless communication node, comprising:
at least one processor configured to:
receive a first message from a first wireless communication node requesting to either establish or modify a context of a data radio bearer (DRB) within the second communication node, the context of the DRB associated with a bearer context for a user equipment (UE) device; and
transmit a second message to the first wireless communication node indicating that the context of the DRB has been established or modified at the second wireless communication node,
wherein the first message comprises DRB allocation information, and first user plane address information of the DRB associated with the bearer context, the first user plane address information comprising a S1 Uplink (UL) General Packet Radio Service Tunneling Protocol (GTP) Tunnel Endpoint Identifier (TEID) or a NG UL GTP TEID,
wherein the second message comprises second user plane address information of the DRB associated with the bearer context, the second user plane address information comprising a F1 UL GTP TEID at the second wireless communication node, and a S1 Downlink (DL) GTP TEID or a NG DL GTP TEID at the second wireless communication node, and
wherein in response to the DRB allocation information of the first message indicating that the first wireless communication node is serving the user equipment device via Dual Connectivity (DC) and Packet Data Convergence Protocol (PDCP) of the DRB is located in the first wireless communication node, the first user plane address information of the DRB further comprises: a DL GTP TEID in a master node.

17. The second wireless communication node of claim 16, wherein:
the first wireless communication node functions as a control plane of a central unit; and the second wireless communication node functions as a user plane of the central unit.

18. The second wireless communication node of claim 16, wherein the second user plane address information of the DRB further comprises at least one of:
- a X2 DL Forwarding GTP TEID or a Xn DL Forwarding GTP TEID; or
- a X2 UL Forwarding GTP TEID or a Xn UL Forwarding GTP TEID.

* * * * *